United States Patent [19]

von Erichsen

[11] Patent Number: 5,007,456
[45] Date of Patent: Apr. 16, 1991

[54] CLOSING ARRANGEMENT FOR DUCTS HAVING LARGE CROSS-SECTIONAL AREAS, PARTICULARLY FLUE GAS DUCTS

[75] Inventor: Volker von Erichsen, Recklinghausen, Fed. Rep. of Germany

[73] Assignee: Stober & Morlock Wärmekraft Gesellschaft mbH

[21] Appl. No.: 424,596

[22] Filed: Oct. 20, 1989

[30] Foreign Application Priority Data

Oct. 27, 1988 [DE] Fed. Rep. of Germany ....... 3836861

[51] Int. Cl.$^5$ .............................................. F16K 11/16
[52] U.S. Cl. .................................... 137/601; 137/865; 251/229
[58] Field of Search ............... 137/601, 607, 865, 862; 251/279, 229; 98/121.2

[56] References Cited

U.S. PATENT DOCUMENTS

| | | | |
|---|---|---|---|
| 1,159,566 | 11/1915 | Brigel | 137/865 X |
| 4,259,987 | 4/1981 | Janssen | 137/601 X |
| 4,442,862 | 4/1984 | McCabe | 137/601 |
| 4,457,336 | 7/1984 | Allan et al. | 137/601 |
| 4,535,811 | 8/1985 | Wood et al. | 137/601 |
| 4,749,004 | 6/1988 | Peash | 137/865 |

FOREIGN PATENT DOCUMENTS 1293793 10/1972 United Kingdom ................ 137/601

Primary Examiner—Stephen M. Hepperle
Attorney, Agent, or Firm—Toren, McGeady & Associates

[57] ABSTRACT

A closing arrangement for ducts having large cross-sectional areas, particularly flue gas ducts for power plants. The arrangement includes at least two flaps which are mounted on at least one flap shaft. Lever arrangements composed of crank arms and tightening arms for swinging the flaps are connected to the flaps. At least one drive shaft is connected to the lever arrangements. The drive shaft extends transversely of the flap shaft. The transverse arrangement of the drive shaft makes it possible to open and close the flaps by means of a single drive shaft.

3 Claims, 6 Drawing Sheets

CLOSING ARRANGEMENT FOR DUCTS HAVING LARGE CROSS-SECTIONAL AREAS, PARTICULARLY FLUE GAS DUCTS

BACKGROUND OF THE INVENTION

1. Field of the Invention

The present invention relates to a closing arrangement for ducts having large cross-sectional areas, particularly flue gas ducts for power plants. The arrangement includes at least one flap which is mounted on at least one flap shaft and is arranged either in the duct or within the duct walls. Each flap can be swung by means of at least one drive shaft and lever arrangements composed of crank arms and tightening arms.

2. Description of the Related Art

Various embodiments of the closing arrangement described above are known in the art. Locking arrangements of this type have at least two flaps. When they are used in power plants and particularly in the waste gas or flue gas ducts of power plants, they have extremely large cross-sectional areas of 100 $m^2$ or more. Thus, significant problems occur when these large flap wings are moved and when they are pressed against the sealing members arranged in the duct. Therefore, it is necessary to provide at least two flaps for closing off the flue gas flow in a duct having such a large cross-sectional area.

In order to absorb the kinetic energy of the flue gases when the wing flaps are being closed and to move the large masses of the wing components, a drive shaft is provided for each wing component. The drive shaft provided for each wing component is rotatably mounted parallel to the pivot axis of the flap. Each drive shaft is provided with a drive which is either located on the inside or on the outside. Since a drive shaft is provided for each flap or wing component, the shafts arranged in the cross-sectional area of the duct form a flow resistance when the locking arrangement is in the open state. Moreover, the drive units arranged on the inside are subjected to the aggressive flue gases in the flow duct. Therefore, a locking arrangement of this type arranged in a duct having such a large cross-sectional area is structurally complicated and, consequently, is also expensive.

It is, therefore, the primary object of the present invention to provide a locking arrangement of the above-described type in which flaps of large size can be moved in a flue gas duct with structurally simple means. Also, the construction and maintenance costs are to be low.

SUMMARY OF THE INVENTION

In accordance with the present invention, in a locking arrangement of the above-described type having at least two flaps for ducts with large cross-sectional areas, particularly flue gases for power plants, the drive shaft is arranged transversely of the flap shaft.

The transverse placement of the drive shaft in the duct cross-section makes it possible to arrange only a single shaft in the cross-section as the means for opening, wherein lever arrangements connect the flaps and the drive shaft. As a result, locking arrangements of this type are structurally simpler and the flow losses occurring when the locking arrangement is open can be reduced.

In accordance with a preferred feature of the present invention, the drive shaft is rotatably arranged in the duct cross-section in front of the flap arrangement. Since the drive shaft is drivable by means of a drive unit arranged outside of the duct cross-section, an electric drive or a hydraulic drive used as the drive is protected against the aggressive flue gases. Thus, the wear and required maintenance of such units can be substantially reduced which, in turn, means that the arrangement is less expensive.

In accordance with a further development of the invention, when flaps having a great height are involved, several pipe shafts which extend parallel to each other are arranged in the cross-sectional area of the duct and the ends of the drive shafts are driven by a drive shaft which extends transversely of the drive shafts in the duct and connects these drive shafts outside of the cross-section of the duct through transmission units. When flaps having a great height are needed for a large cross-sectional area of the duct and only a single drive shaft is used, the kinetic energy of the flue gases can result in large bending moments during the closing and opening procedures of the flaps.

In order to eliminate the bending moments described above, it is possible to stiffen the flaps which, however, leads to the disadvantage that the flaps have a great weight. In order to solve this problem, when such high flaps are used, two parallel drive shafts are arranged in the cross-sectional area of the duct and another transversely arranged drive shaft is provided for driving the ends of the shafts extending through the duct walls through transmission units. Accordingly, since a drive shaft each is arranged in the upper portion and in the lower portion of high flaps, bending moments during opening and closing the locking arrangement can be eliminated and it is no longer necessary to provide oversized flap wings.

In accordance with a preferred feature of the invention, several lever arrangements for connecting the flap or flaps with the drive shaft or shafts in an articulated manner are fastened on the drive shafts mounted in the cross-sectional area of the duct. By providing or fastening several lever arrangements on the transversely mounted drive shaft, it is possible to control several flap wings in the duct cross-section.

In accordance with a further development of the invention, the crank arms of each lever arrangement are rigidly connected to the drive shafts, wherein the free ends of the crank arms extend perpendicularly to the plane of the closed flap and wherein a tightening arm connects the flap with the free end of the crank arm in an articulated manner. Since the crank arm or crank arms extend perpendicularly to the plane of the closed flap, it is ensured that the crank arms extend in flow direction of the flue gas after the crank arms have been swung by 180 to open the flaps. Accordingly, no additional flow resistance exists in the cross-sectional area of the duct.

In accordance with another further development of the invention, the shafts of the flaps are arranged centrally in the longitudinal axis of each flap and the tightening arms of the lever arrangement act on the flap eccentrically relative to the longitudinal axis. In this type of construction, a joint lever is advantageously connected rigidly to the centrally located longitudinal axis of such a shutter-type flap and the joint lever is arranged at an angle relative to the plane of the flap, wherein the free end of the joint lever is connected to the tightening arm in an articulated manner.

In accordance with an advantageous further development of the invention, when a perpendicularly extending branch duct is provided, at least one drive shaft is provided in each of the ducts and the two shafts are rotatably connected in the points of intersection of the two shafts outside of the branch duct through a transmission unit, for example, a bevel gear transmission unit, and to drive the two drive shafts are driven by a drive unit. This makes it possible to alternately close and open the two duct branches and, thus, the overall arrangement of the duct and the branch ducts acts as a switch for deflecting flue gas flows in ducts having large cross-sectional areas.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
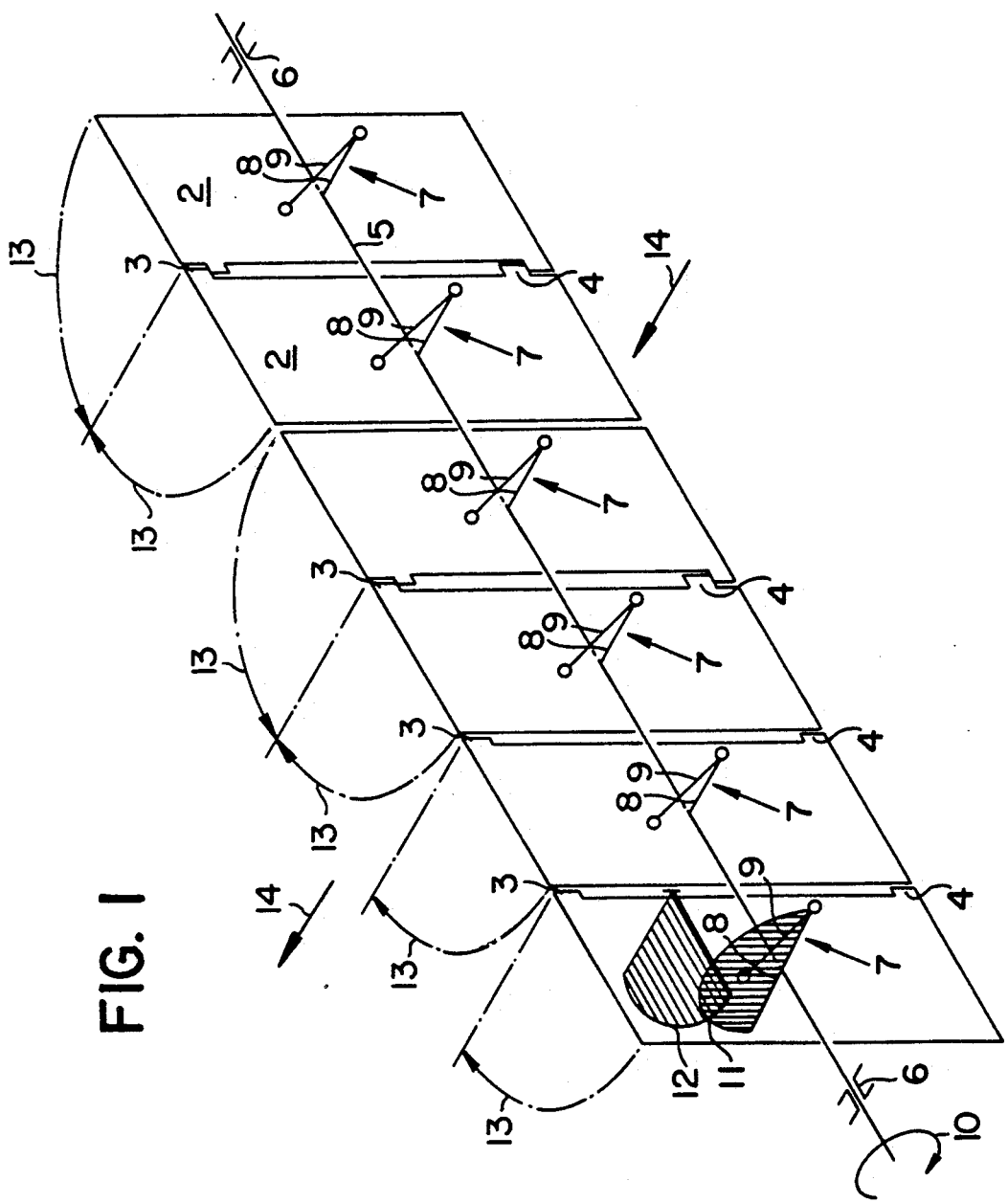
FIG. 1 is a schematic perspective view of the drive side of a multiple-ring flap arrangement with a drive shaft extending transversely over the direction of rotation of the flaps and with lever systems for the flaps.

In FIG. 1 of the drawing, a multiple-wing flap arrangement is denoted in its totality by reference numeral 1. Flap arrangement 1 is used particularly in ducts having large rectangular cross-sections, for example, in flue gas ducts of power plants, for closing off a flue gas flow. The individual flaps of the flap arrangement 1 are denoted by reference numeral 2. The individual flaps 2 are arranged in the flue gas duct so as to be pivotable through hinges 3 and 4. Flap shafts schematically illustrated in the drawing are arranged or fastened either outside or inside the duct wall. A flap 2 which opens to the left and a flap 2 which opens to the right may be arranged on one flap shaft.

In accordance with another embodiment, each flap 2 may be arranged on flap shaft. A drive shaft 5 is arranged in front of the flap arrangement 1 extending transversely of the direction of pivoting of the flaps 2. The drive shaft 5 is rotatably mounted in bearings 6. Lever arrangements 7 connect the individual flaps 2 with the drive shaft 5. Crank arms 8 are rigidly mounted on the drive shaft 5. The crank arms 8 are fastened on the drive shaft 5 in such a way that the ends thereof extend perpendicularly to the plane of the flap 2. Tightening arms 9 are connected in an articulated manner to the free ends of the crank arms 8. The other end of each tightening arm 9 acts through a joint on the corresponding flap 2.

When the drive shaft 5 is turned counterclockwise by 180° by means of a drive unit, not shown, the free end of the crank arm 8 is moved to the opposite side in accordance with the spherical curve 11 shown in FIG. 1. During this pivoting process, the point at which the tightening arm 9 is connected in an articulated manner to a flap 2 moves along a path which corresponds to the spherical curve 12.

Thus, the lever arrangement 7 on the drive shaft 5 opens the flaps 2 in flow direction 14 when the drive shaft 5 is turned by 180°. In order to return the flaps 2 into the closed position, the drive shaft 5 is turned clockwise in the direction of arrow 10. During the closing and opening movements of the flaps 2, the free corners of the flaps 2 travel along a path indicated by dash-dotted lines 13.

Figure 2:
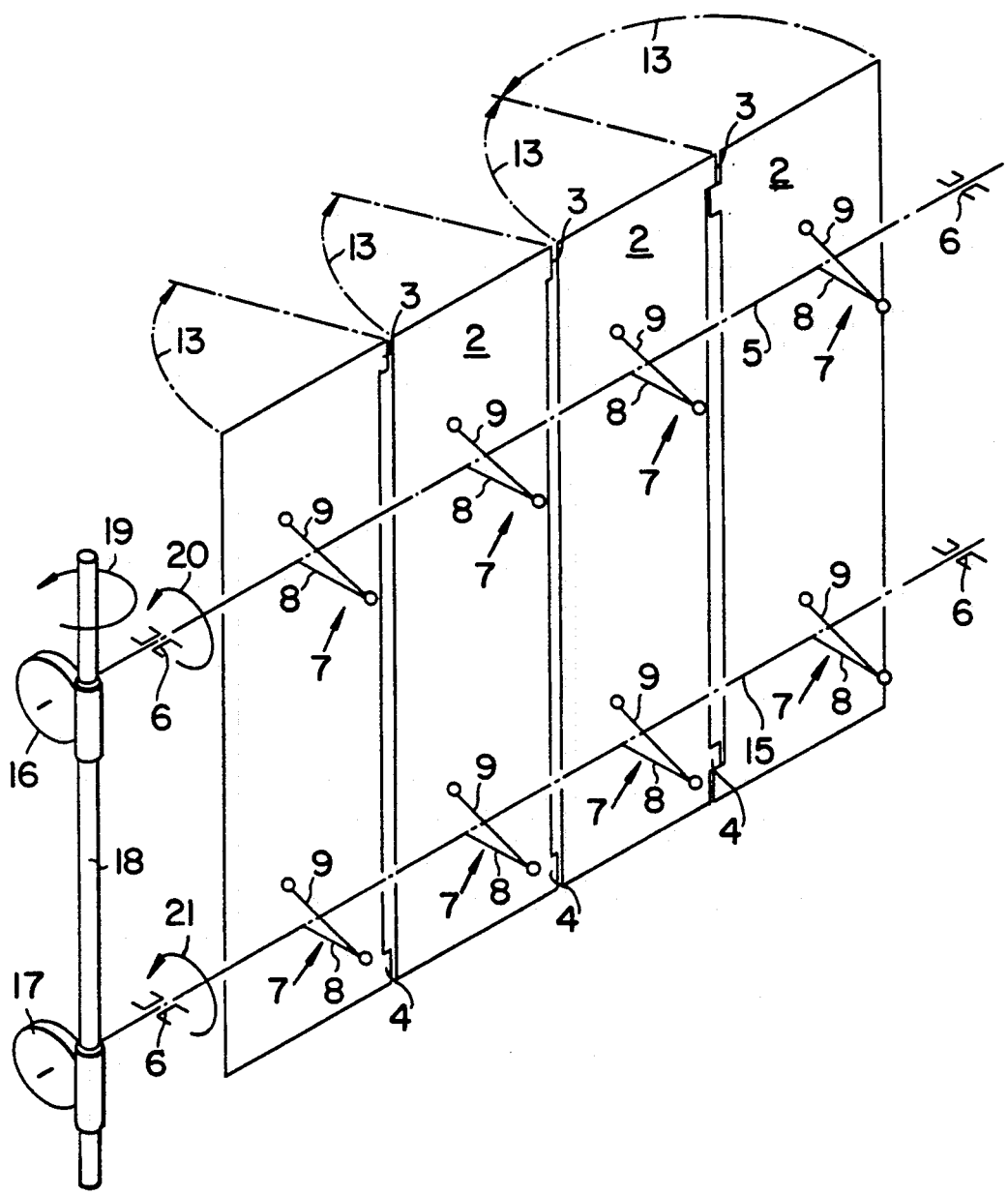
FIG. 2 is a view similar to FIG. 1 with two parallel drive shafts.

FIG. 2 of the drawing shows a multiple-wing flap arrangement in which the flaps 2 have a relatively great height. For moving these high flaps 2, two drive shafts 5 and 15 are arranged parallel to each other and transversely of the pivoting direction of the flap 2. Both drive shafts 5 and 15 open and close the flaps 2 through lever arrangements 7 in the same manner as described in FIG. 1. Gear units 16 and 17 connect the drive shaft 5 and the drive shaft 15 to a transversely arranged drive shaft 18. When a drive unit, not shown in the drawing, applies a torque on the drive shaft 18 in the direction of arrow 19, the forces are transmitted through the transmission units 16 and 17 onto the drive shafts 5 and 15, so that the crank arms 8 are swung in the direction of arrows 20 and 21.

Figure 3:
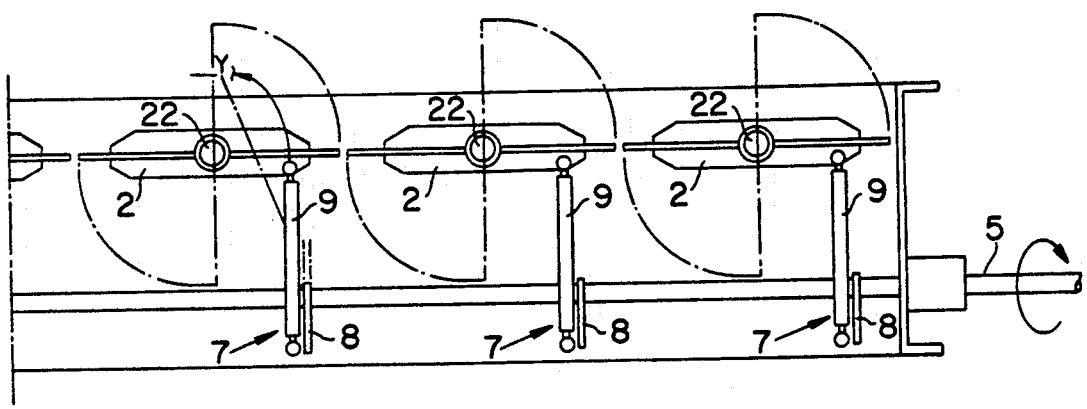
FIG. 3 is a partial top view of another embodiment of the invention with centrally mounted shutter-type flaps.

In the embodiment illustrated in FIG. 3, flap shafts 22 are arranged centrally in the longitudinal axis of the flaps 2. The drive shaft 5 arranged transversely of the pivoting direction of the flaps 2 is connected to flaps 2 in an articulated manner through lever arrangements 7. Each lever arrangement 7 is arranged in such a way that the tightening arm 9 acts on the flap 2 in a point which is located eccentrically.

Figure 4:
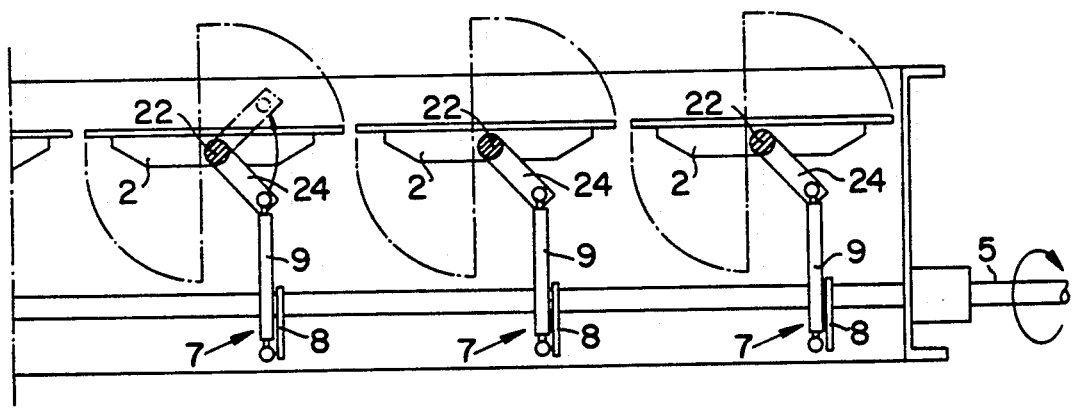
FIG. 4 is a partial top view of a further development of the embodiment of FIG. 3.

In the embodiment shown in FIG. 4, a joint lever 24 is rigidly connected to the flap shaft 22. The tightening arm 9 acts on the end of the joint lever 24 in the same manner as in FIG. 3.

Figure 5:
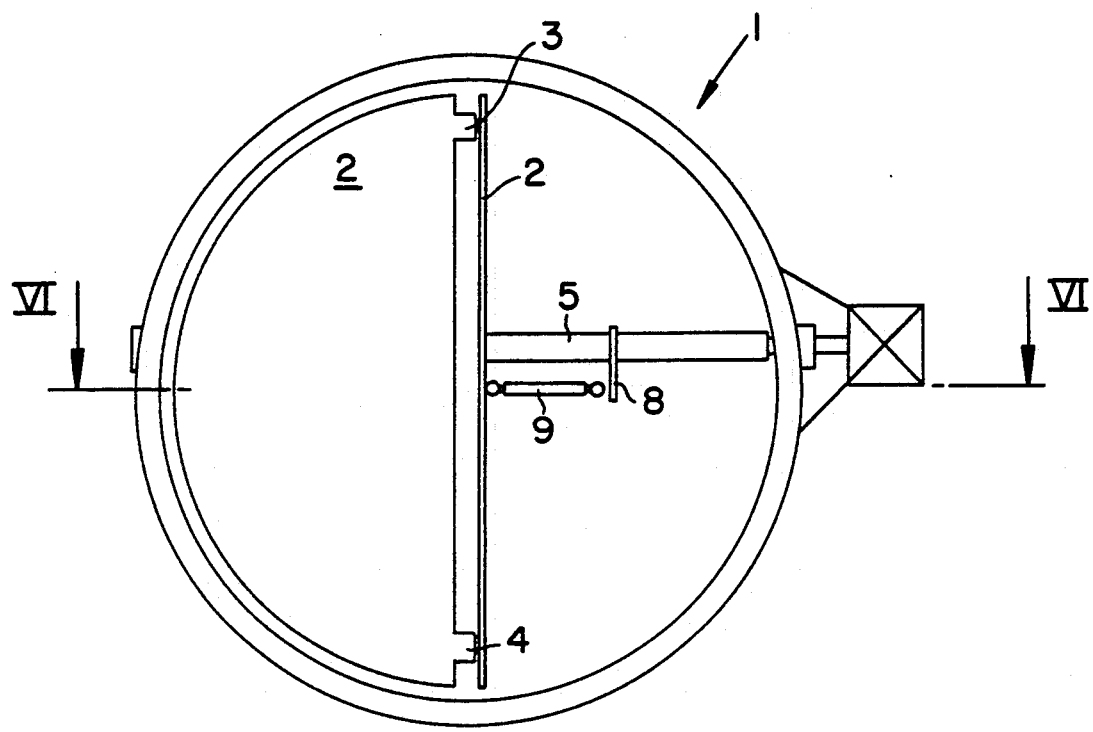
FIG. 5 is a top view of a locking flap with two rings for circular cross-sections.
Figure 6:
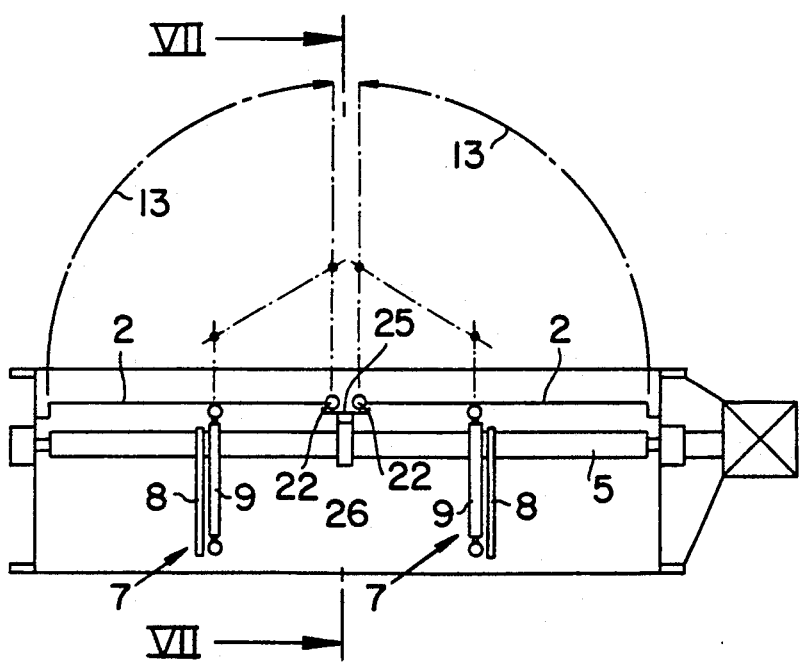
FIG. 6 is sectional view along sectional line VI—VI of FIG. 5.
Figure 7:
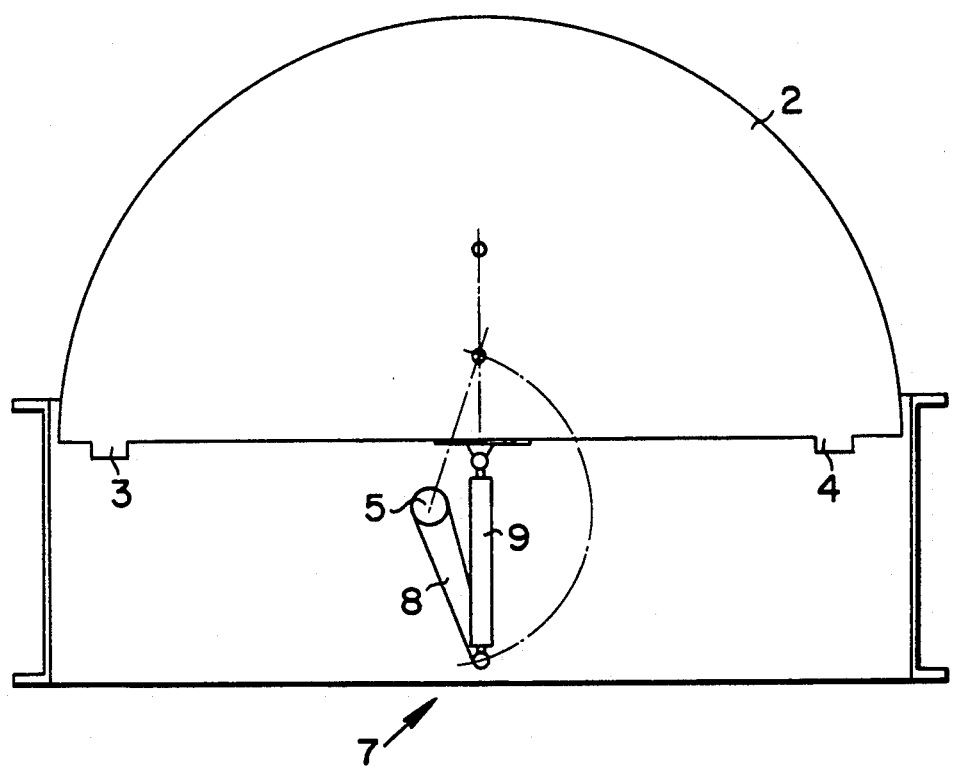
FIG. 7 is a sectional view along section al line VII—VII of FIG. 6.

FIG. 5 of the drawing shows a flap arrangement 1 for round cross-sections in which two semicircular flaps 2 each are arranged to be swung about a flap shaft 22. The flap shafts 22 are mounted parallel to the longitudinal direction and centrally in the cross-section of the circle. The drive shaft 5 is arranged offset transversely by 90° and is arranged offset parallel relative to the central axis. A web 25 is mounted in the center axis below the flap shafts. Another bearing point 26 is provided on the web 25. The pivoting mechanism for closing and opening the flaps operates in the same manner as described above.

Figure 8:
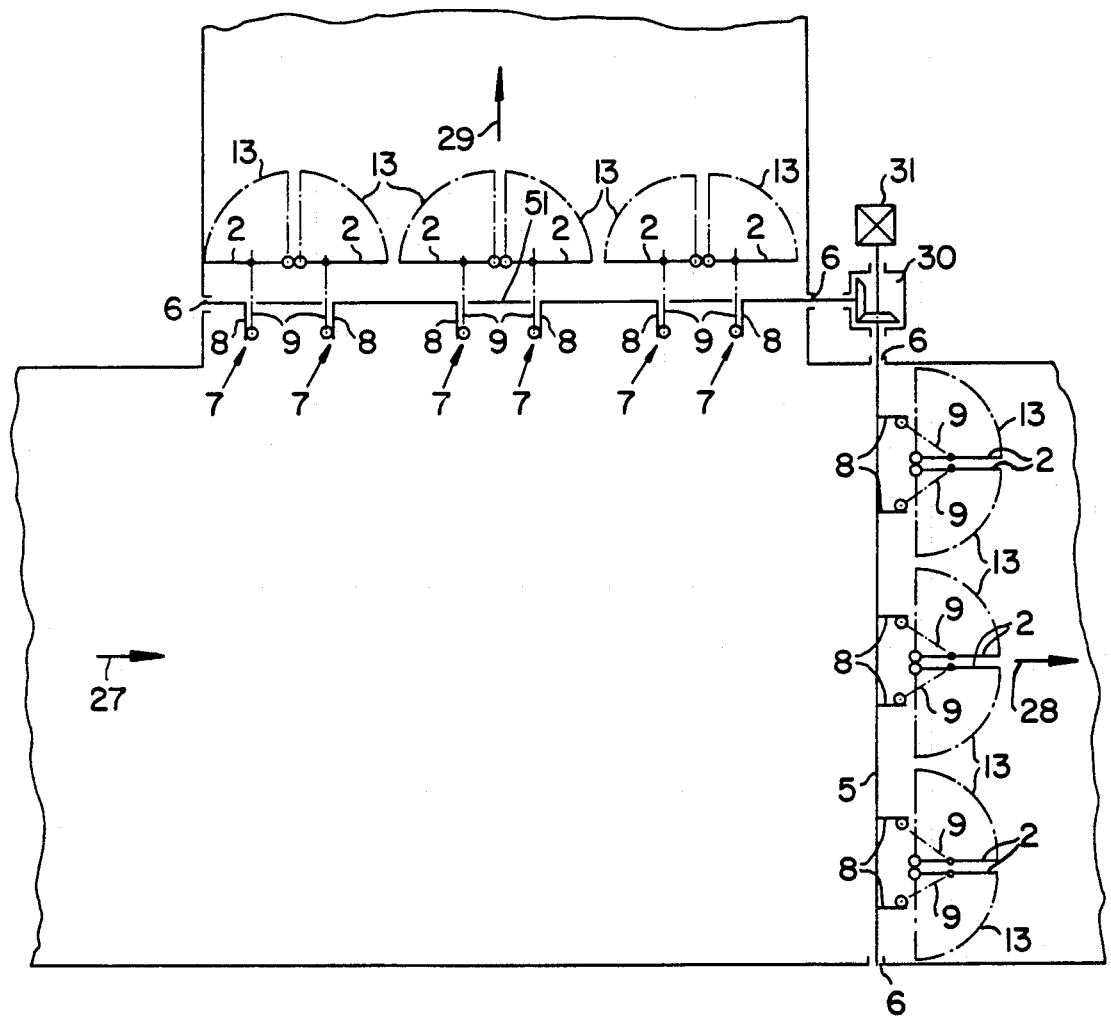
FIG. 8 is a top view of an arrangement of flaps according to the present invention with two drive shafts arranged perpendicularly relative to each other and with one drive.

Another embodiment of the locking arrangement according to the present invention is illustrated in FIG. 8. In this embodiment, the flue gases conducted in the direction of arrow 27 can be conducted further in the direction of arrow 28 to a heat exchanger or they can be deflected in the direction of arrow 29 to the smokestack by actuating the locking members. For actuating the locking members, a drive shaft 5 and 51 each are arranged in each duct branch 28, 29. A bevel gear transmission unit 30 is arranged in the point of intersection of the two shafts 5 and 51 which extend perpendicularly relative to each other. A drive unit 31 is rotatably connected to the bevel gear transmission unit 30. When the drive unit 31 is actuated, the flaps 2 in the flue gas duct to the heat exchanger are closed and the flaps 2 in the flue gas duct to the smokestack are simultaneously opened. This makes it possible in an easy manner to effect a deflection of the flue ga by using two drive shafts 5 and 51 and a drive unit 31, wherein the two duct branches can be alternately opened and closed. Thus, the overall arrangement of the duct branches acts as a switch for deflecting flue gas flows in ducts having large cross-sectional areas.

While specific embodiments of the invention have been shown and described in detail to illustrate the application of the inventive principles, it will be understood that the invention may be embodied otherwise without departing from such principles.

I claim:

1. A closing arrangement for ducts defined by walls and having large cross-sectional areas, particularly flue gas ducts for power plants, the arrangement comprising at least two flaps which are mounted on at least one flap shaft and are arranged in one of the ducts and within the duct walls, lever arrangements comprising crank arms and tightening arms for swinging the flaps between an open position and a closed position being connected to the flaps, at least one drive shaft being connected to the lever arrangements, wherein the drive shaft extends transversely of the at least one flap shaft, wherein the flaps each have a central longitudinal axis, the flap shaft being arranged centrally in the longitudinal axis of each flap and the tightening arm of each lever arrangement acting on the flap eccentrically relative to the longitudinal axis, the arrangement further comprising a joint lever having first and second ends, the first end of the joint lever being rigidly connected to the centrally located longitudinal axis of each flap, the joint lever being arranged at an angle relative to the flap, wherein the second end of the joint lever is connected to the tightening arm in an articulated manner.

2. The arrangement according to claim 1, the arrangement being provided in a first duct and in a second branch duct extending perpendicularly to the first duct, the at least one drive shaft of the first duct and the at least one drive shaft of the second duct intersecting at a point of intersection outside of the ducts, comprising a transmission unit for rotatably connecting the shafts at the point of intersection, and a drive unit for driving the drive shafts.

3. The arrangement according to claim 2, wherein the transmission unit is a bevel gear transmission unit.

* * * * *